(12) United States Patent
Lee et al.

(10) Patent No.: US 7,626,414 B2
(45) Date of Patent: Dec. 1, 2009

(54) MULTIPLE TESTING BARS FOR TESTING LIQUID CRYSTAL DISPLAY AND METHOD THEREOF

(75) Inventors: Sang-Kyoung Lee, Seongnam (KR); Dong-Gyu Kim, Suwon (KR); Min-Hyung Moon, Cheonan (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 12/250,397

(22) Filed: Oct. 13, 2008

(65) Prior Publication Data

US 2009/0039348 A1  Feb. 12, 2009

Related U.S. Application Data

(63) Continuation of application No. 11/492,291, filed on Jul. 24, 2006, now Pat. No. 7,446,556, which is a continuation of application No. 11/272,735, filed on Nov. 15, 2005, now Pat. No. 7,081,770, which is a continuation of application No. 10/705,836, filed on Nov. 13, 2003, now Pat. No. 6,982,569, which is a continuation of application No. 09/206,317, filed on Dec. 7, 1998, now Pat. No. 6,734,925.

(30) Foreign Application Priority Data

Dec. 5, 1997 (KR) ................... 97-66154
Nov. 18, 1998 (KR) ................... 98-49389

(51) Int. Cl.
G01R 31/00 (2006.01)

(52) U.S. Cl. ......................... 324/770; 349/40

(58) Field of Classification Search ................ None
See application file for complete search history.

(56) References Cited

U.S. PATENT DOCUMENTS

| | | | |
|---|---|---|---|
| 5,598,283 A | 1/1997 | Fujii et al. | |
| 5,668,032 A | 9/1997 | Holmberg et al. | |
| 6,005,647 A | 12/1999 | Lim | |
| 6,013,923 A | 1/2000 | Huang | |
| 6,025,891 A | 2/2000 | Kim | |
| 6,028,442 A * | 2/2000 | Lee et al. | 324/770 |
| 6,091,464 A | 7/2000 | Song | |
| 6,111,620 A | 8/2000 | Nishiki et al. | |

(Continued)

FOREIGN PATENT DOCUMENTS

JP  1-233425  9/1989

(Continued)

*Primary Examiner*—Minh N Tang
(74) *Attorney, Agent, or Firm*—Innovation Counsel LLP

(57) ABSTRACT

A plurality of gate lines are formed on an insulating substrate in the horizontal direction, a gate shorting bar connected to the data lines is formed in the vertical direction and a gate insulating film is formed thereon. A plurality of data lines intersecting the gate lines are formed on the gate insulating film in the vertical direction, and a data shorting bar connected to the data lines is formed outside the display region. A first shorting bar is formed on the gate insulating film, located between the gate lines and the gate shorting bar, and connected to the odd gate lines. A second secondary shorting bar is formed parallel to the first shorting bar and connected to the even gate lines.

13 Claims, 21 Drawing Sheets

U.S. PATENT DOCUMENTS

| | | |
|---|---|---|
| 6,734,925 B1 | 5/2004 | Lee et al. |
| 6,982,768 B2 | 1/2006 | Ohori et al. |
| 6,982,569 B2 | 12/2007 | Lee et al. |
| 7,375,375 B2 | 5/2008 | Yamazaki et al. |
| 2001/0045997 A1 | 11/2001 | Kim |

FOREIGN PATENT DOCUMENTS

| | | |
|---|---|---|
| JP | 2-135490 | 5/1990 |
| JP | 03-094223 | 4/1991 |
| JP | 3-134628 | 6/1991 |
| JP | 04-179926 | 6/1992 |
| JP | 4179926 A | 6/1992 |
| JP | 5005866 A | 1/1993 |
| JP | 7-5481 | 1/1994 |
| JP | 6-82817 | 3/1994 |
| JP | 6-82836 | 3/1994 |
| JP | 8-15733 | 1/1996 |
| JP | 8005691 A | 1/1996 |
| JP | 08-328033 | 12/1996 |
| JP | 09-074253 | 3/1997 |
| JP | 9-127552 | 5/1997 |
| JP | 9185072 A | 7/1997 |
| JP | 10-020334 | 1/1998 |
| JP | 10-133214 | 5/1998 |
| JP | 10-186392 | 7/1998 |
| JP | 11-119683 | 4/1999 |

\* cited by examiner

FIG.15A

MODE 1

|   | R | G | B | R | G | B |
|---|---|---|---|---|---|---|
|   | + | − | − | + | − | − |
|   | − | + | − | − | + | − |
|   | + | − | − | + | − | − |
|   | − | + | − | − | + | − |
|   | + | − | − | + | − | − |
|   | − | + | − | − | + | − |

FIG.15B

MODE 2

|   | R | G | B | R | G | B |
|---|---|---|---|---|---|---|
|   | − | + | − | − | + | − |
|   | − | − | + | − | − | + |
|   | − | + | − | − | + | − |
|   | − | − | + | − | − | + |
|   | − | + | − | − | + | − |
|   | − | − | + | − | − | + |

FIG.15C

MODE 3

|   R   |   G   |   B   |   R   |   G   |   B   |
|-------|-------|-------|-------|-------|-------|
|   −   |   −   |   +   |   −   |   −   |   +   |
|   +   |   −   |   −   |   +   |   −   |   −   |
|   −   |   −   |   +   |   −   |   −   |   +   |
|   +   |   −   |   −   |   +   |   −   |   −   |
|   −   |   −   |   +   |   −   |   −   |   +   |
|   +   |   −   |   −   |   +   |   −   |   −   |

FIG.17A

*MODE 4*

| R | G | B | R | G | B |
|---|---|---|---|---|---|
| + | − | + | + | − | + |
| − | + | − | − | + | − |
| + | − | + | + | − | + |
| − | + | − | − | + | − |
| + | − | + | + | − | + |
| − | + | − | − | + | − |

FIG.17B

*MODE 5*

| R | G | B | R | G | B |
|---|---|---|---|---|---|
| + | + | − | + | + | − |
| − | − | + | − | − | + |
| + | + | − | + | + | − |
| − | − | + | − | − | + |
| + | + | − | + | + | − |
| − | − | + | − | − | + |

MULTIPLE TESTING BARS FOR TESTING LIQUID CRYSTAL DISPLAY AND METHOD THEREOF

CROSS REFERENCE TO PRIOR APPLICATIONS

This application is a Continuation Application of U.S. patent application Ser. No. 11/492,291 filed Jul. 24, 2006, now U.S. Pat. No. 7,446,556, which is a Continuation Application of U.S. patent application Ser. No. 11/272,735 filed Nov. 15, 2005, now issued as U.S. Pat. No. 7,081,770, which is a Continuation Application of U.S. patent application Ser. No. 10/705,836 filed Nov. 13, 2003 and issued as U.S. Pat. No. 6,982,569, which is a Continuation Application of U.S. patent application Ser. No. 09/206,317 filed Dec. 7, 1998 and issued as U.S. Pat. No. 6,734,925, which claims priority to and the benefit of Korean Patent Application No. 97-66154 filed Dec. 5, 1997 and Korean Patent Application No. 98-49389 filed Nov. 18, 1998, which are all hereby incorporated by reference for all purposes as if fully set forth herein.

BACKGROUND OF THE INVENTION (a) Field of the Invention

The present invention relates to liquid crystal displays (referred as LCDs hereinafter), manufacturing methods thereof and testing methods thereof, in particular, to LCDs having more than two shorting bars, and methods for detecting defects in the LCDs by using the shorting bars.

(b) Description of the Related Art

Shorting bars of a liquid crystal display are used to discharge a electrostatic charges generated in the manufacturing process of the LCD and to test the LCD after the manufacturing process is completed.

A conventional LCD is described in detail with reference to the accompanying drawings. FIG. 1 is a schematic diagram of a conventional thin film transistor (referred as TFT hereinafter) substrate for an LCD having shorting bars, FIG. 2 is an enlarged view of the part A in FIG. 1 and FIG. 3 is a cross-sectional view taken along line III-III' in FIG. 2.

As shown in FIGS. 1 to 3, gate lines G1, G2, G3, G4, . . . are formed on a substrate 1 and extend in the horizontal direction, and a gate pad 10 is formed at one end of each gate line. A gate shorting bar 20 that electrically connects the gate lines G1, G2, G3, G4, . . . all together and is formed on the substrate 1, extends in the vertical direction, and is located opposite the gate lines G1, G2, G3, G4, . . . with respect to the gate pads 10. A pair of testing pads 2 is formed at both ends of the gate shorting bars 20.

A gate insulating film 15 covers a gate wire 5 such as the gate lines G1, G2, G3, G4, . . . , the gate pads 10 and the gate shorting bar 20. Data lines D1, D2, D3, D4, . . . are formed on the gate insulating film 15 and extends in the vertical direction, and a data pad 30 is formed at one end of each data line. A data shorting bar 40 that electrically connects the data lines D1, D2, D3, D4, . . . all together is formed on the gate insulating film 15, extends in the horizontal direction. A pair of testing pads 3 is formed at both ends of the date shorting bars 40. The gate shorting bar 20 and the data shorting bar 40 may be connected to each other by a resistor.

An insulating film 25 covers a data wire including the data lines D1, D2, D3, D4, . . . , the data pads 30 and the data shorting bar 40, and some portions of the insulation films 15 and 25 on the data pads 30 and the gate pads 10 are removed.

Pixel regions are defined as the area surrounded by the two adjacent gate lines and the two adjacent data lines, and a display area includes the pixel regions. A TFT that turns on by a scan signal from the gate line and transmits image signals from the data line into the pixel region is formed in each of the pixel regions.

In this structure, electrostatic charges generated in the manufacturing process are discharged or dispersed through the gate shorting bar 20 and the data shorting bar 40. Meanwhile, after the manufacturing process and the array test are finished, the gate shorting bar 20 and the data shorting bar 40 are removed by cutting the substrate along line L.

Next, the mechanism of a conventional array test is described with reference to FIGS. 1 and 4. FIG. 4 shows polarities of signals for an array test that are applied to the pixel regions. Voltages for an array test are applied to the testing pads 2 and 3. Since the gate lines G1, G2, G3, G4, . . . and the data lines D1, D2, D3, D4, . . . are respectively connected to the shorting bars 20 and 40, the TFTs of the pixel regions turn on simultaneously and a testing signal is applied in all R, G, B pixels as shown in FIG. 4. Therefore, in the normally white mode, the pixel regions PX represent dark state.

In case that the wires are disconnected or that the TFT has a defect, the pixels related to the defects turns to a bright state, and thus the defected elements may be detected with ease. However, if more than two gate lines or data lines, for example, the data lines D2 and D3 in FIG. 1, are short-circuited (S1), it is hard to detect the short-circuited elements since the voltage of the same magnitude and polarity is applied to the two data lines D2 and D3.

Meanwhile, if the shorting bar become divided into more than two and connected different gate lines or data lines to solve the previously described disadvantage, the detecting capability may increase. However, the protecting capability against electrostatic charges may decrease.

SUMMARY OF THE INVENTION

It is an object of the present invention to provide a TFT array panel having shorting bars that are superior in detecting short-circuit defects as well as in discharging electrostatic charges.

It is another object of the present invention to provide a test method to detect short-circuit defects between adjacent data lines or adjacent gate lines and pixel defects with ease.

It is another object of the present invention to provide a test method to effectively detect some defects in a high-resolution substrate.

To achieve these objects of the present invention, a plurality of gate lines are formed in parallel with one another and two shorting bars for tests are formed in a manner to respectively link every other gate lines. A main shorting bar linking all gate lines is formed outside the shorting bars.

The gate lines and the shorting bars for test may be coupled by conductive coupling patterns.

A plurality of data lines may be formed in perpendicular to the gate lines, three shorting bars for tests may respectively link to the sequences of the data lines one after another and the data shorting bars and the data lines may be coupled to each other by conductive coupling patterns.

Moreover, it is desirable that the gate lines and the data lines link all together outside the data shorting bars by the main shorting bar.

In a method of manufacturing the LCD, the conductive coupling patterns are formed at the step of forming transparent pixel electrodes.

The gate lines and the data lines may be separated from the main shorting bar after the conductive coupling patterns are formed.

According to the LCDs and the manufacturing methods of the present invention, the additional gate shorting bars or the additional data shorting bars are formed and separated from the main shorting bar after the process is over. Accordingly, the LCD substrate is superior in detecting short-circuited defects of the substrate as well as in discharging the electrostatic charges.

In testing methods according to embodiments of the present invention, gate pulses are applied to two secondary lines for tests that are respectively connected to even gate lines and to odd gate lines and data signals are applied to three secondary lines for test that are respectively connected to one of R, G and B pixels in sequence. In detail, a signal having the first polarity is applied to two of three adjacent data lines and a signal having the opposite polarity of the first is applied to the rest of the three adjacent data lines when the pulse is applied to the even gate lines. Then, the signal having the first polarity is applied to two of the three adjacent data lines chosen in a different combination concerning to the first choice and the signal having the opposite polarity of the first is applied to the rest of the three adjacent data lines.

In this test method according to the present invention, it is possible to detect short-circuited defects between adjacent pixels or adjacent wires, and the detecting ability of visual defects and the reliability are increased.

BRIEF DESCRIPTION OF THE DRAWINGS

FIGS. 15A to 15C illustrate polarities of signals applied to R, G, B pixels according to the first embodiment;

FIGS. 17A to 17B illustrate polarities of signals applied to R, G, B pixels according to the second embodiment;

DETAILED DESCRIPTION OF THE PREFERRED EMBODIMENTS

Figure 1:
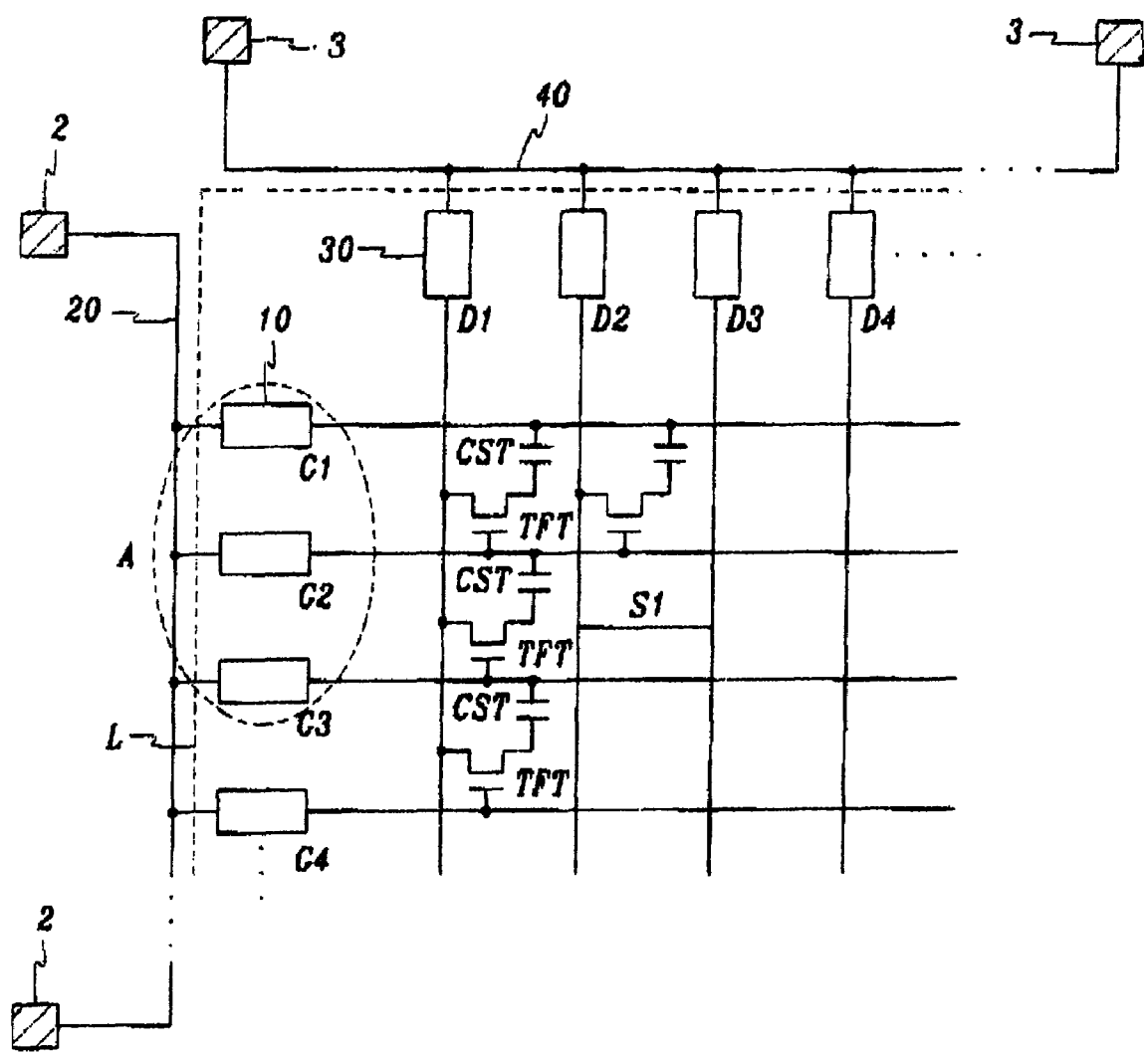
FIG. 1 is a schematic diagram of a thin film transistor (TFT) substrate for a LCD having shorting bars according to the conventional invention.
Figure 2:
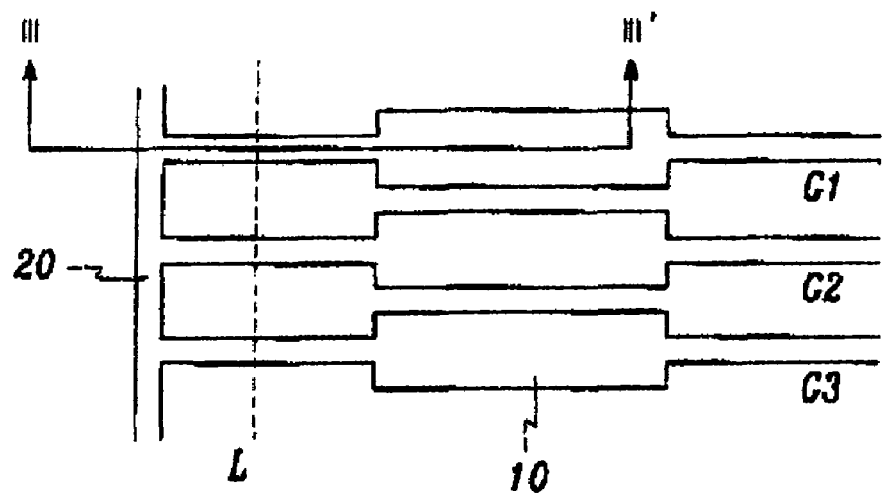
FIG. 2 is an enlarged layout view of a portion A in FIG. 1.
Figure 3:
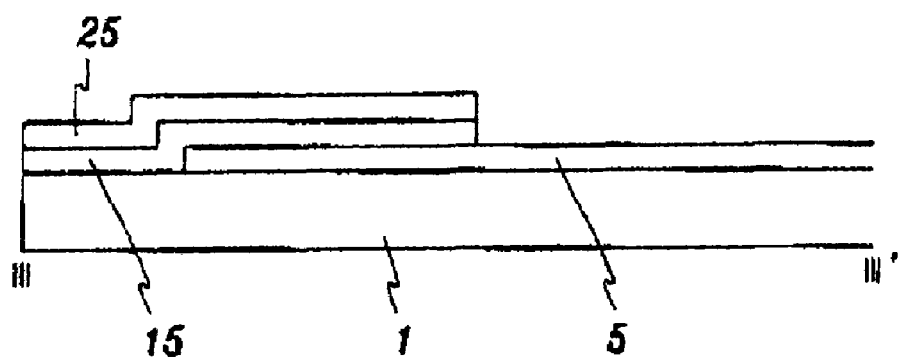
FIG. 3 is a cross-sectional view taken along line III-III' in FIG. 2.
Figure 4:
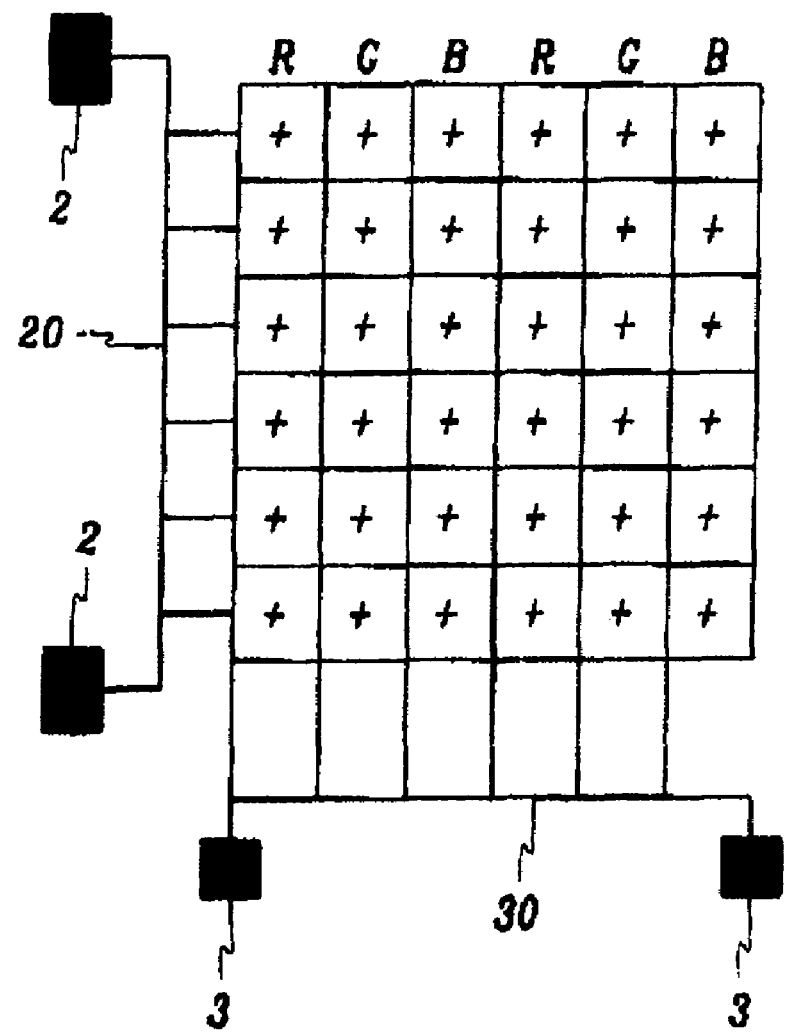
FIG. 4 is a schematic diagram of pixel matrix in which array test signals are applied.

The present invention now will be described more fully hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numbers refer to like elements throughout. It will be understood that when an element such as a layer, region or substrate is referred to as being "on" another element, it can be directly on the other element or intervening elements may also be present.

Figure 5:
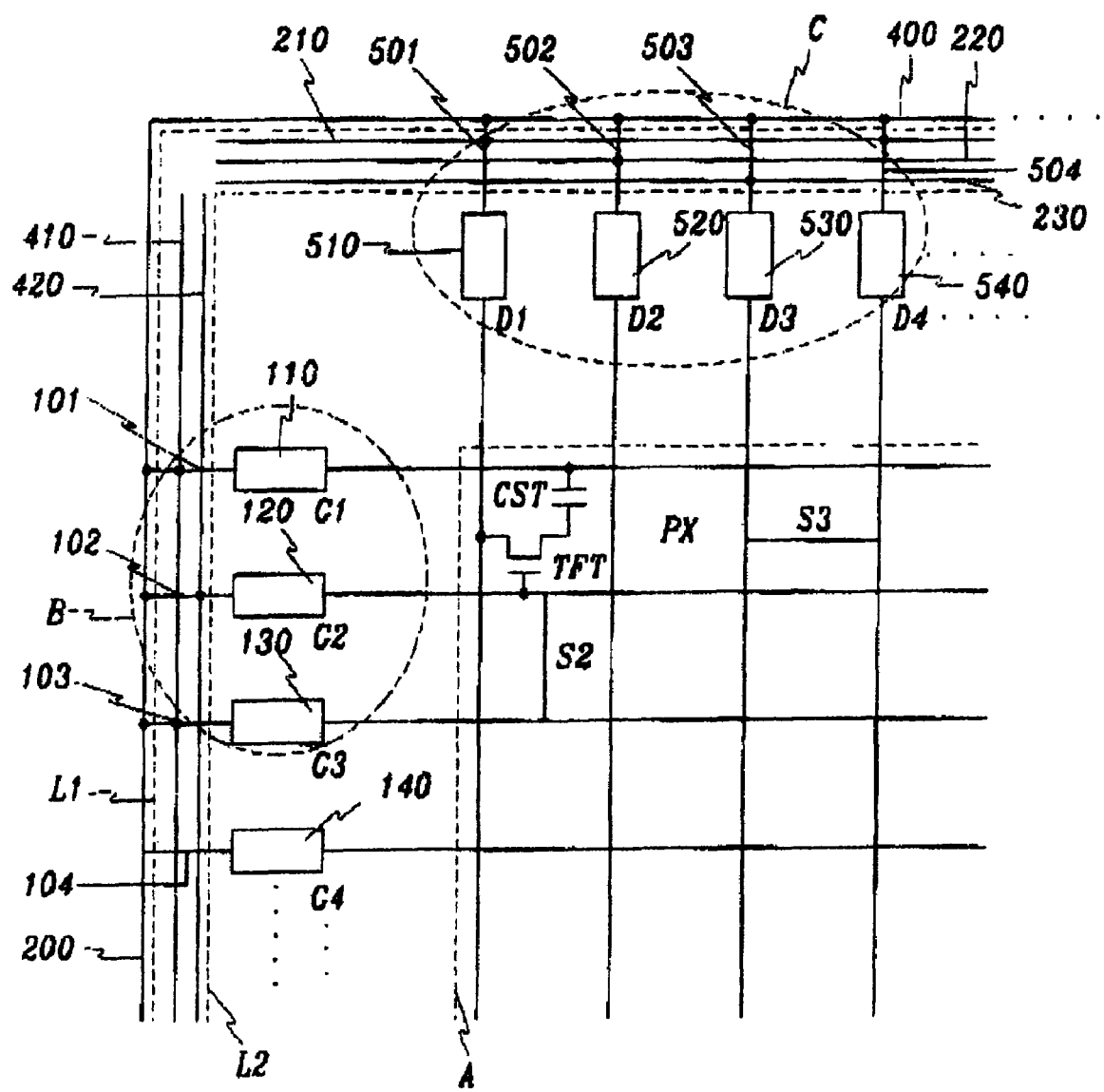
FIG. 5 is a schematic diagram of a TFT array panel for LCDs having shorting bars according to the present invention.

LCDs and methods of manufacturing the same will be described hereinafter with reference to FIG. 5. FIG. 5 is a schematic diagram of a TFT array panel for an LCD having shorting bars according to embodiments of the present invention, in which wires for electrostatic discharge protection and for detecting defects are not removed yet.

Gate lines G1, G2, G3, G4, . . . made of a material such as Al extends in the horizontal direction and gate pads 110, 120, 130, 140, . . . are formed at one ends of respective gate lines. Data lines D1, D2, D3, D4, . . . made of Cr or Mo are formed on an insulating film (not shown) that covers the gate lines, and extend in the vertical direction. Data pads 510, 520, 530, 540, . . . are formed at one ends of respective data lines.

A plurality of pixel regions PX are defined as the area surrounded by the two adjacent gate lines and the two adjacent data lines, and a display area includes the pixel regions. A TFT is formed in each pixel region so that the image signals from the data lines D1, D2, D3, D4, . . . can be transmitted into the pixels when the scan signals from the gate lines G1, G2, G3, G4, . . . turn on the TFTs.

Electrostatic charges usually generated in the step of forming those wires may cause defects of the TFTs, the gate or the data wires of the pixel regions PX. To avoid those defects, a gate shorting bar 200 and a data shorting bar 400 are required.

The gate shorting bar 200 made of the same material as the gate wire extends in the vertical direction, located outside the display region and connected to the gate extensions 101, 102, 103, 104 that extend from the gate pads 110, 120, 130, 140 in the horizontal direction. The data shorting bar 400 made of the same material as the data wire extends in the horizontal direction, located outside the display region and connected to the data extensions 501, 502, 503 and 504 that extend from the data pads 510, 520, 530 and 540 in the vertical direction. The gate shorting bar 200 and the data shorting bar 400 are connected to each other through a contact hole in the insulating film.

The gate shorting bar 200 and the data shorting bar 400 discharge and disperse the electrostatic charges generated in the wires of the substrate during the manufacturing process. They are removed from the substrate by cutting the substrate along a cutting line LI.

Next, the array test for the display area is performed. The array test is performed by using secondary lines 410 and 420; 210, 220 and 230. A first secondary line 410 and a second secondary line 420 made of the data metal such as Cr and Mo are arranged between the gate shorting bar 200 and the gate pads 110, 120, 130 and 140 and parallel to the gate shorting bar 200. A third secondary line 210, a fourth secondary line 220 and a fifth secondary line 230 made of the gate metal such as Al are arranged between the data shorting bar 400 and the data pads 510, 520 and 530 and parallel to the data shorting bar 400. The first secondary line 410 and the second secondary line 420 are respectively connected to odd gate lines G1 and G3 and to even gate lines G2 and G4. The third secondary line 210, the fourth secondary line 220 and the fifth secondary line 230 are respectively connected to (3n−2)th date lines, (3n−1)th data lines and (3n)th data lines.

Accordingly, it is possible to detect some defects in the substrate by applying different signals to even gate lines and to odd gate lines through the first secondary line 410 and the second secondary line 420 and by applying R, G and B signals to the (3n−2)th data line, (3n−1)th data line and (3n)th data line.

Now, the structure of the gate shorting bar 200, the first and the second secondary lines 410 and 420, the data shorting bar 400 and the third, the fourth, and the fifth secondary lines 210, 220 and 230 will be described in detail with reference to FIG. 6 to FIG. 10.

Figure 6:
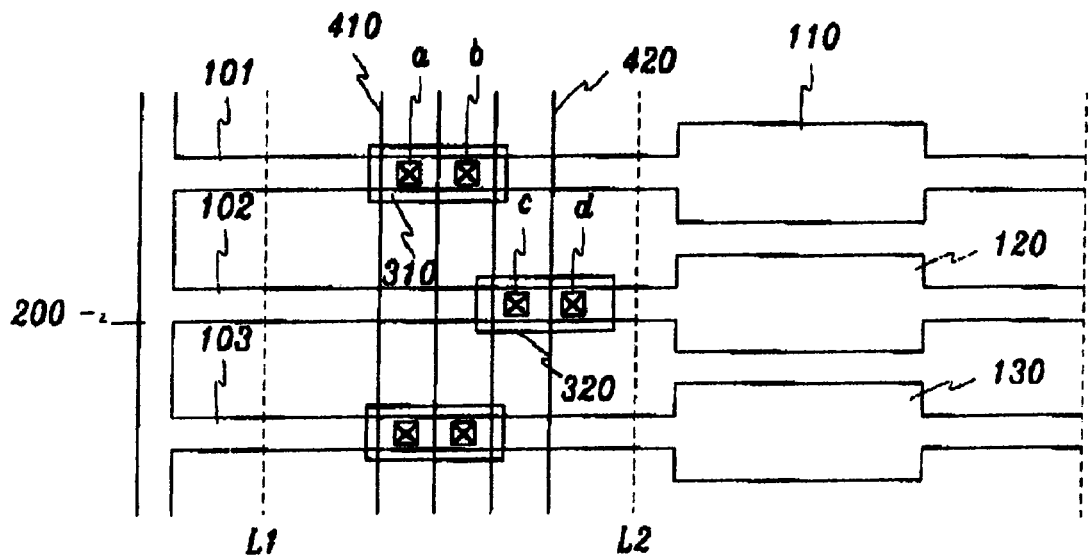
FIG. 6 is an enlarged layout view of a portion B in FIG. 5 according to the first embodiment of the present invention.
Figure 7:
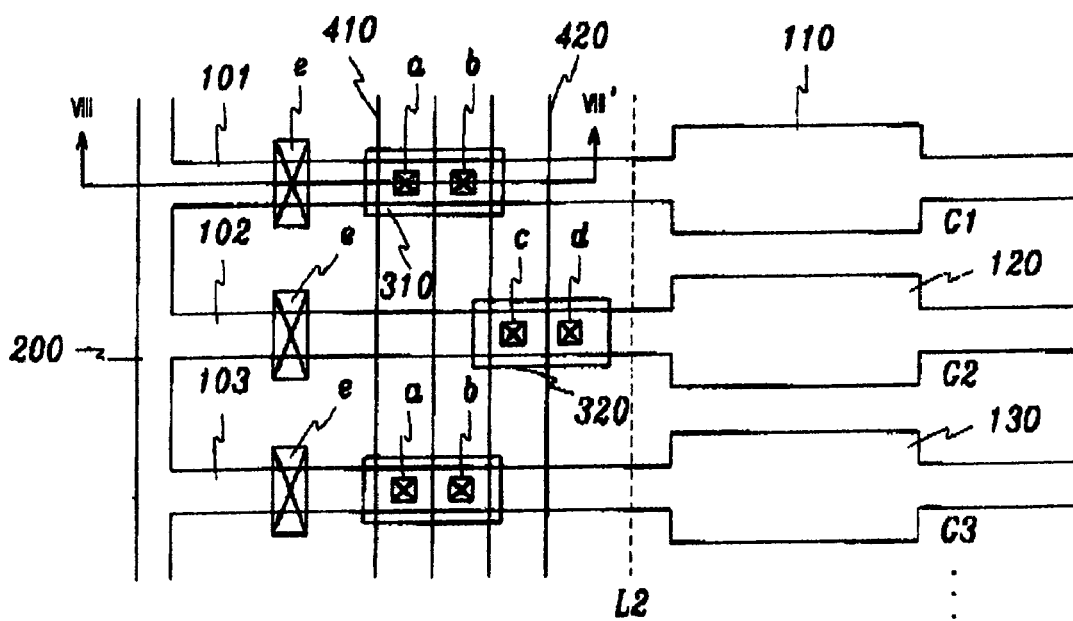
FIG. 7 is another enlarged layout view of a portion B in FIG. 5 according to the second embodiment of the present invention.
Figure 8:
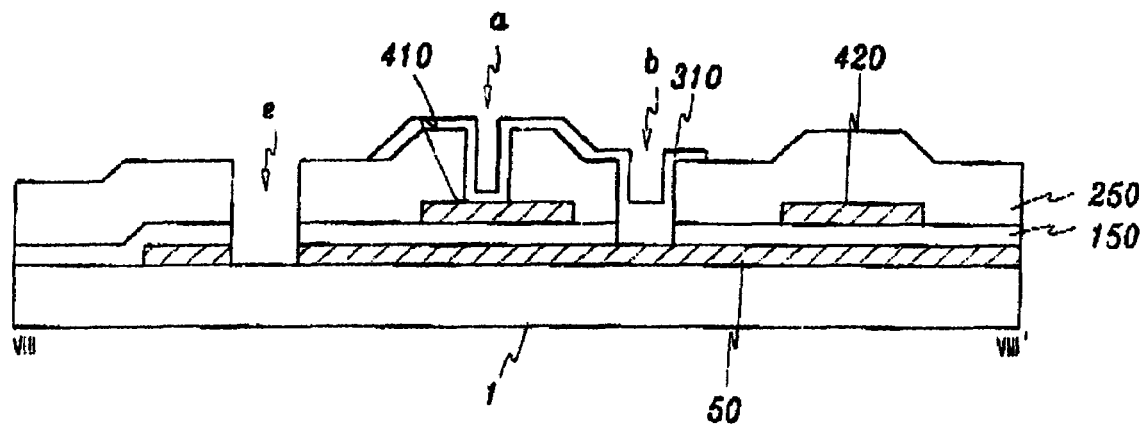
FIG. 8 is a cross-sectional view taken along line VIII-VIII' in FIG. 7.

FIGS. 6 and 7 are enlarged layout views of a portion B in FIG. 5 according to a first embodiment and a second embodiment of the present invention. FIG. 8 is a cross-sectional view taken along line VIII-VIII' in FIG. 7, in which the connection between a gate shorting bar and secondary lines is shown.

Gate extensions 101, 102, and 103 extend from gate pads 110, 120 and 130 formed on a substrate 1 to vertically extended gate shorting bars 200 on the substrate 1. A gate insulating film 150 is formed thereon, and a first secondary line 410 and a second secondary line 420 are formed on the gate insulating film 150. The first and the second secondary lines 410 and 420 are located between the gate pads 100, 110 and 120 and the gate shorting bar 200 in parallel to the gate shorting bar 200. A passivation film 250 is formed thereon.

Connecting members 310 and 320, which are made of the same material as pixel electrodes (not shown), are formed on the passivation film 250 at which the gate extensions overlap the first secondary line or the second secondary line. The connecting member 310 is connected to the first secondary line 410 through a contact hole (a) in the passivation film 250 and to the gate extension 101 through a contact hole (b) in the passivation film 250 and the gate insulating film 150. The connecting member 320 is connected to the second secondary line 420 through a contact hole (c) in the passivation film 250 and to the gate extension 102 through a contact hole (d) pierced in the passivation film 250 and the gate insulating film 150. That is, the gate extensions 101 and 102 are respectively connected to the first and the second secondary lines 410 and 420 by the connecting members 310 and 320.

As previously described, the gate shorting bar is electrically separated from the secondary lines 410 and 420 by cutting the substrate along the cutting line L1 before array tests, and the secondary lines 410 and 420 are removed by cutting along the cutting line L2 outside the display region after the array tests.

A second embodiment shown in FIG. 7 has a structure in which the additional step of removing the gate shorting bar is not required before the array tests. The structure of the connection between the first and the second secondary lines 410 and 420 and the gate extensions 101, 102 and 103 in the second embodiment is similar to the structure in the first embodiment, but each gate extension is separated from the gate shorting bar 200 in a manner that some portions of the gate extensions 101, 102 and 103, the gate insulating film 150 and the passivation film 250 between the gate shorting bar 200 and the first secondary line 410 are removed. The gate extensions 101, 102 and 103 are separated from the gate shorting bar 200 in the final manufacturing step and it will be described more in detail afterward.

In the second embodiment, the step of cutting the substrate before the array test is not required because the gate shorting bar 200 and the secondary lines 410 and 420 are already separated from each other. Instead, after the test, the secondary lines 410 and 420 are removed simultaneously by cutting the substrate along the cutting line L2 as in the first embodiment.

Figure 10:
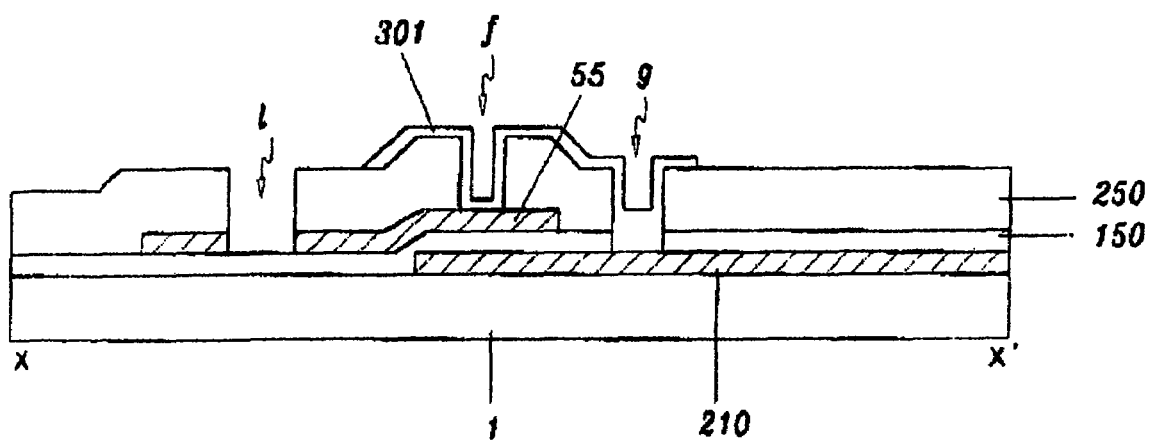
FIG. 10 is a cross-sectional view taken along line X-X' in FIG. 9.
Figure 9:
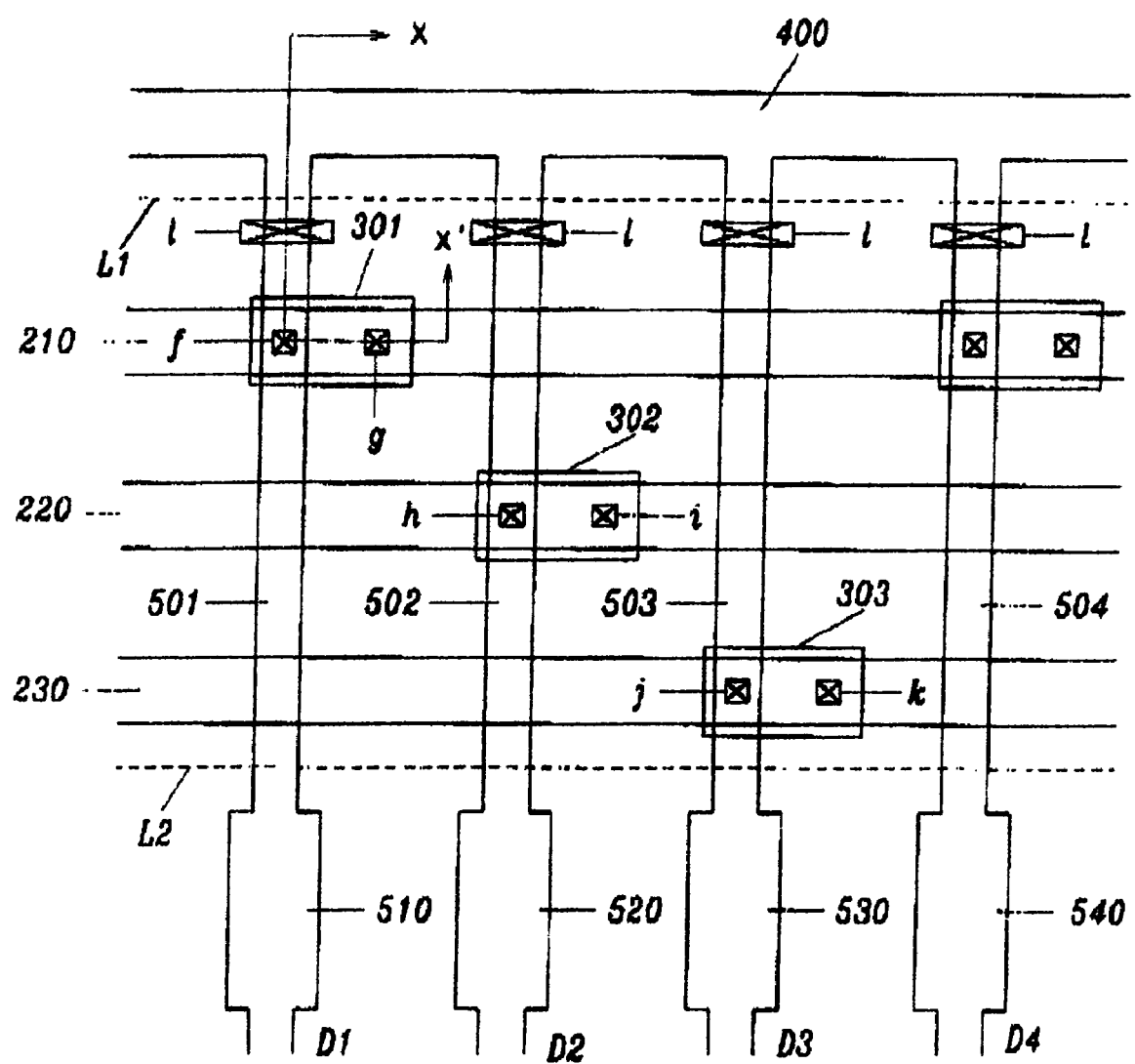
FIG. 9 is an enlarged layout view of a portion C in FIG. 5.

FIG. 9 is an enlarged layout view of a portion C in FIG. 5. FIG. 10 is a cross-sectional view taken along line X-X' in FIG. 9, which specially show the connection of a data shorting bar to a third secondary line, a fourth secondary line and a fifth secondary line.

As shown in FIGS. 9 and 10, a third, a fourth and a fifth secondary lines 210, 220 and 230 made of the same metal as a gate wire are formed on a substrate 1 in the horizontal direction, and a gate insulating film 150 is deposited thereon. A data wire 55, including data lines D1, D2, D3 and D4, data pads 510, 520, 530 and 540, data extensions 501, 502, 503 and 504 extending from the data pads and a data shorting bar 400 connected to the data extensions, is formed on the gate insulating film 150. A passivation film 250 is formed thereon.

Contact holes F, H and J are formed in the passivation film 250 over the respective data extensions 501, 502 and 503 and contact holes G, I and K are formed in the passivation film 250 and the gate insulationg layer 150 over the respective third, fourth and fifth secondary lines 210, 220 and 230. Connecting members 301, 302 and 303 formed on the passivation film 250 respectively connect the third, the fourth and the fifth secondary lines 210, 220 and 230 to every other third data extensions 501, 502 and 503 through the contact holes F, H, J; G, I, K.

Furthermore, the passivation film 250 and the data extensions 501, 502, 503 and 504 are removed between the data shorting bar 400 and the data pads 510, 520, 530 and 540, that is, the data extensions 501, 502, 503 and 504 are disconnected from the data shorting bar 400. As a result, the additional step of cutting the data shorting bar 400 is not required for the array test.

As previously described, three other signals can be applied to the third, fourth and the fifth secondary lines 210, 220 and 230 for detecting pixel defects and short-circuited defects of the TFT array panel since each of the three secondary lines 210, 220, 230 is connected to every other third data extension.

In case more than two data lines D3 and D4 are shorted as shown in FIG. 5, if the different signals are applied to the data lines D2 and D3, the short-circuited defects are detected easily by the differences of luminance from the other pixels. Even though there are three separated secondary lines 210, 220 and 230 in this embodiment, two or more than three secondary lines may be formed.

Next, methods of manufacturing an LCD according to the embodiments of the present invention will be described with reference to FIGS. 11A to 11F and FIGS. 12A to 12F hereinafter. FIGS. 11A to 11F are cross sectional views of the intermediate structures of an LCD panel shown in FIGS. 7 and 8, and FIGS. 12A to 12F are cross sectional views of the intermediate structure of an LCD panel shown in FIGS. 9 and 10.

Figure 11A:
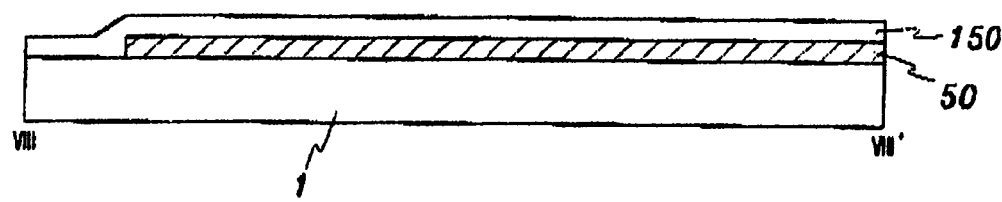
FIGS. 11A to 11F are cross sectional views of the LCD substrate as a manufacturing process according to the embodiment shown in FIGS. 7 and 8.
Figure 12A:
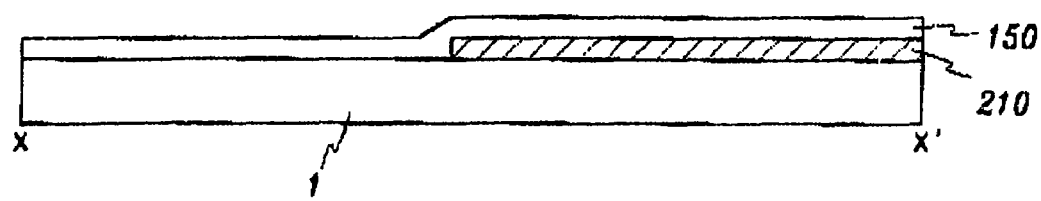
FIGS. 12A to 12F are cross sectional views of the LCD substrate as a manufacturing process according to the embodiment shown in FIGS. 9 and 10.

As shown in FIGS. 11A and 12A, a metal layer is deposited on an insulating substrate 1 and patterned to form a gate wire including gate lines G1, G2, G3 and G4, gate pads 100, 110 and 120, a gate shorting bar 200, gate extensions 101, 102 and 103 and secondary lines 210, 220 and 230. Then, a gate insulating film 150, an amorphous silicon film (not shown)

and a doped silicon film (not shown) are deposited consecutively, and the upper two films are patterned to form an active pattern.

Figure 11B:
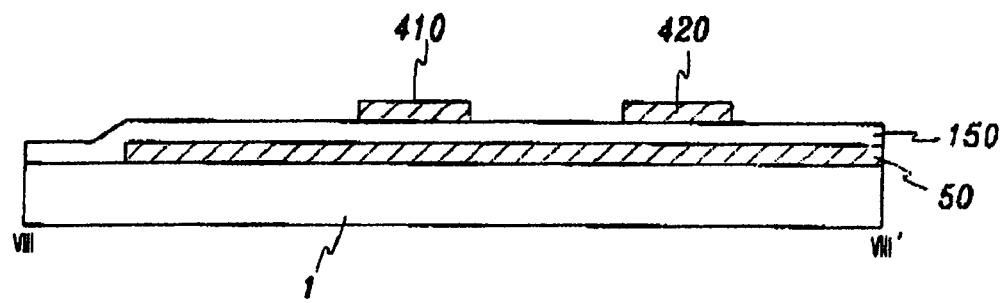
Figure 11C:
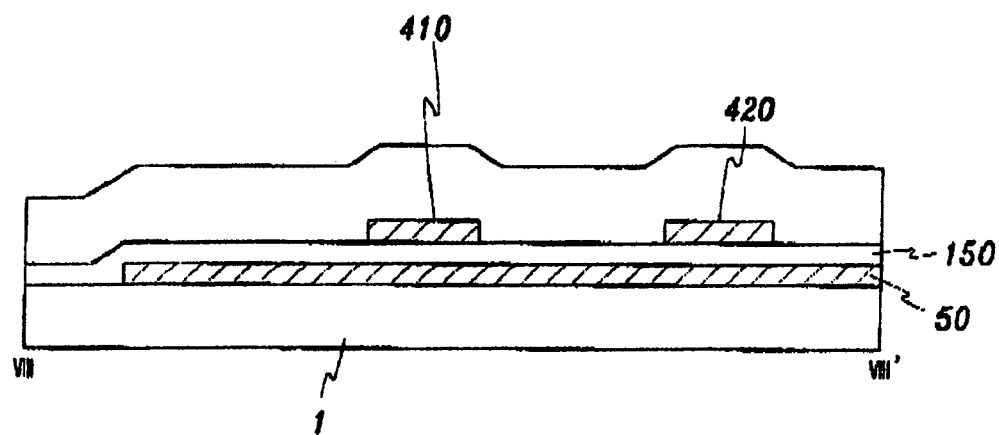
Figure 11D:
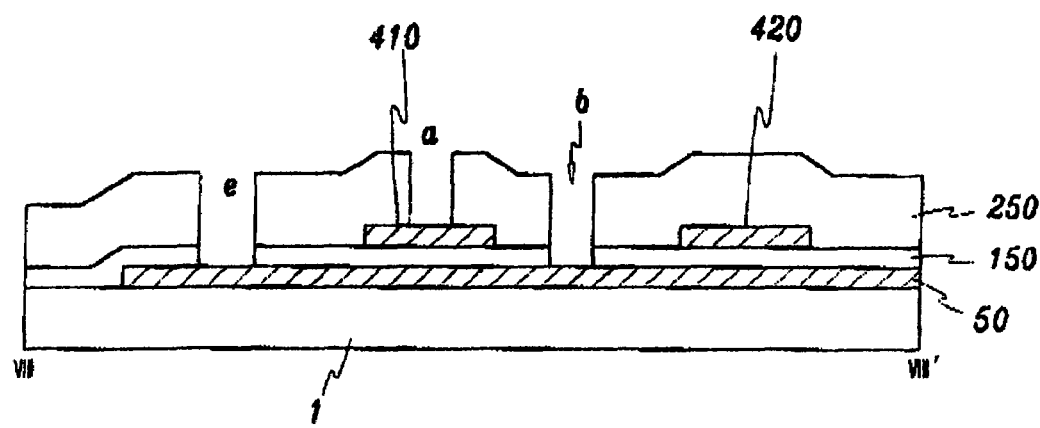
Figure 11E:
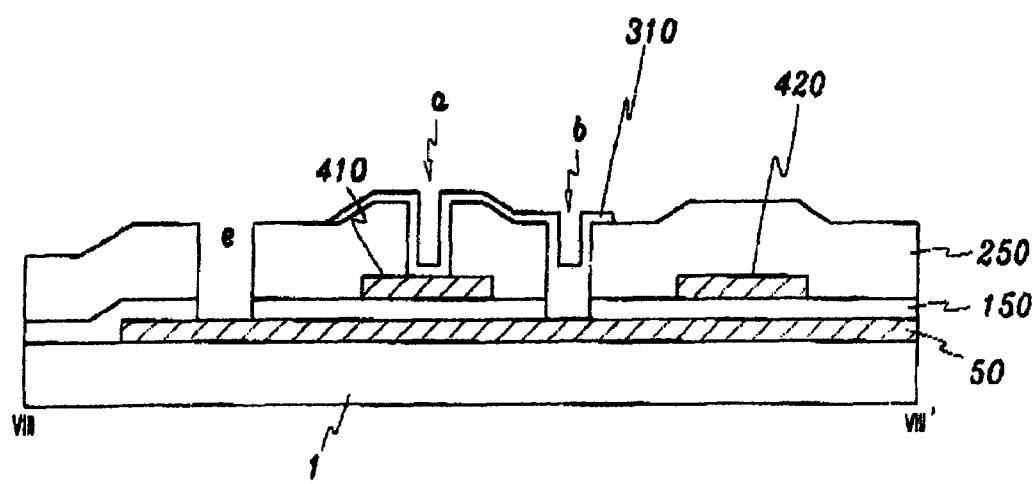
Figure 12B:
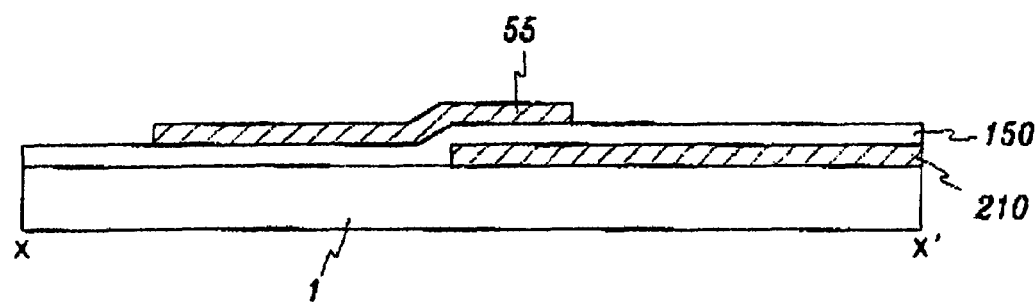
Figure 12C:
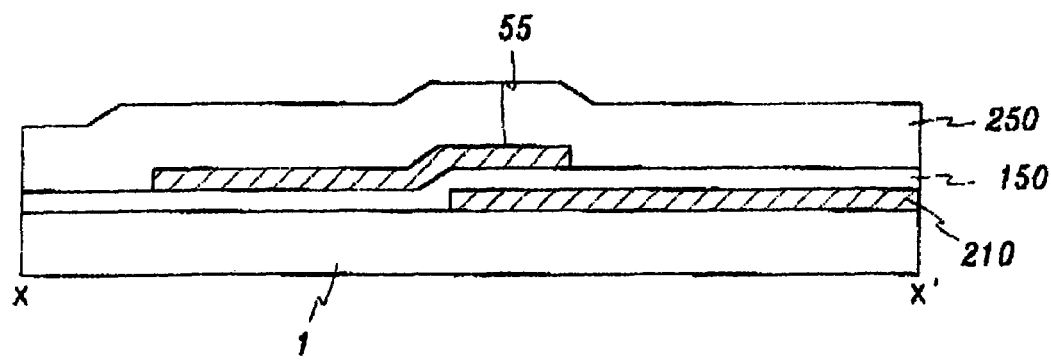
Figure 12D:
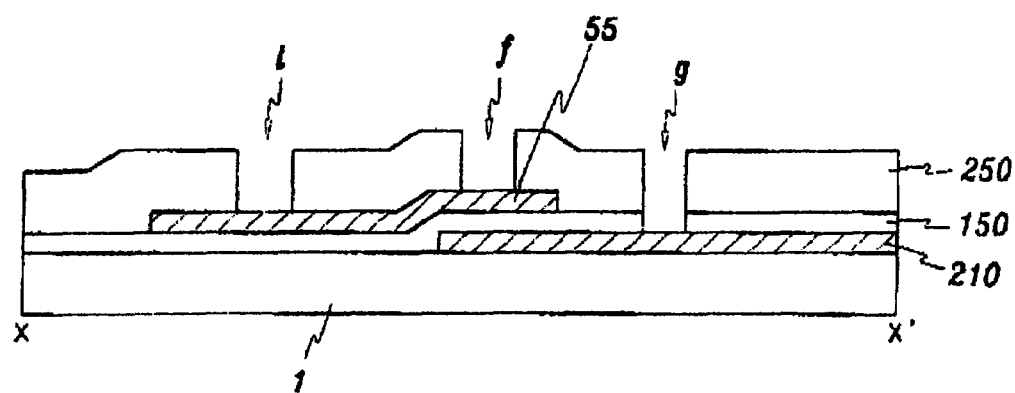
Figure 12E:
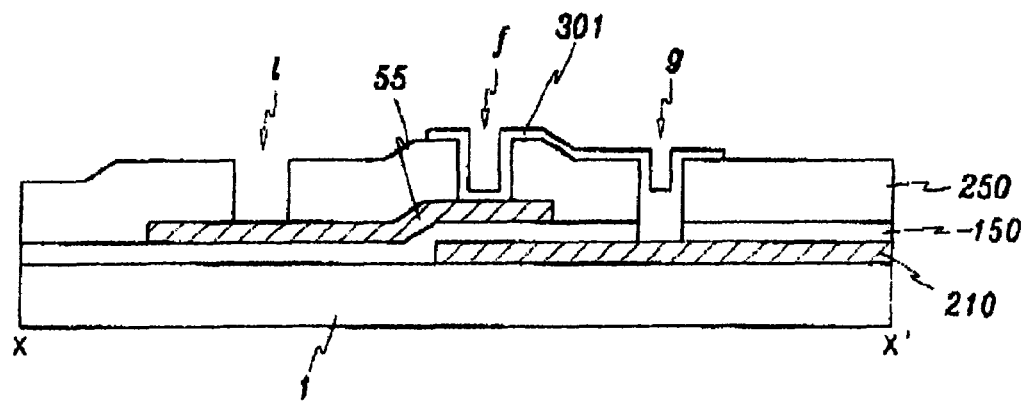

As shown in FIGS. 11B and 12B, a metal layer is deposited and patterned to form a data wire 55 including data lines D1, D2, D3 and D4, a source and a drain electrode (not shown), data pads 500, 510, 520 and 530, a data shorting bar 400, data extensions 501, 502, 503 and 504 and secondary lines 410 and 420. Then, the portions of the doped silicon film are etched by using the data wire 55 as a mask.

As shown in FIGS. 11C, 11D, 12C and 12D, a passivation film 50 is deposited. Then, the passivation film 50 and the gate insulating film 150 are etched to form contact holes E and M exposing the gate pads 110 and 120 and the data pads 510, 520 and 530, and contact holes A, B, C, D, F, G, H, I, J and K exposing the first through the fifth secondary lines 410, 420, 210, 220, 230, the gate extensions 101, 102 and the data extensions 501, 502, 503.

Next, indium-tin-oxide(ITO) is deposited and etched to form pixel electrodes. In the etching process, a first and a second connecting members 310 and 320, and a third, a fourth and a fifth connecting members 301, 302 and 303 are simultaneously formed. The first and the second connecting members 310 and 320 respectively connect the first and the second secondary line 410 and 420 to the gate extensions 101 and 102 through the contact holes A, C, B, D. The third, the fourth and the fifth connecting members 301, 302 and 303 respectively connect the third, the fourth and the fifth secondary line 210, 220 and 230 to every other third data extensions 501, 502 and 503 through the contact holes G, I, K, F, H and J.

Figure 11F:
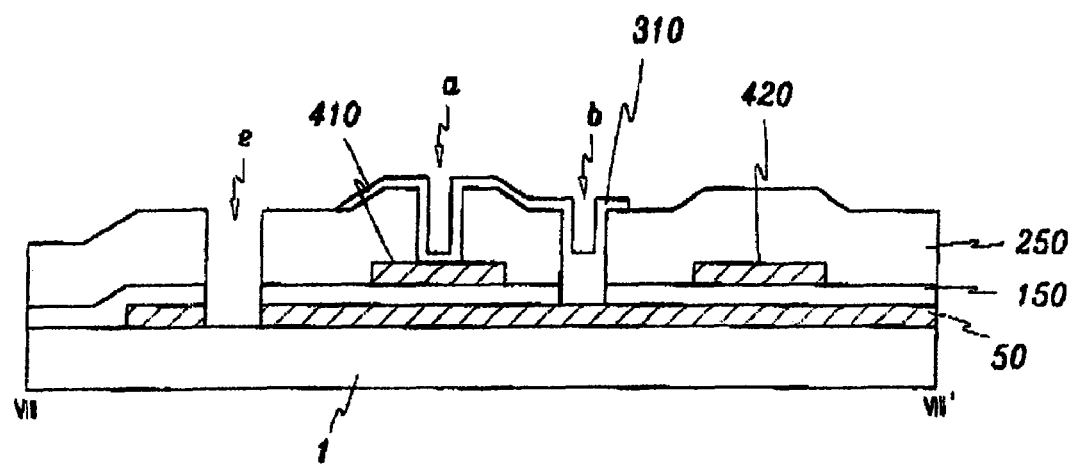
Figure 12F:
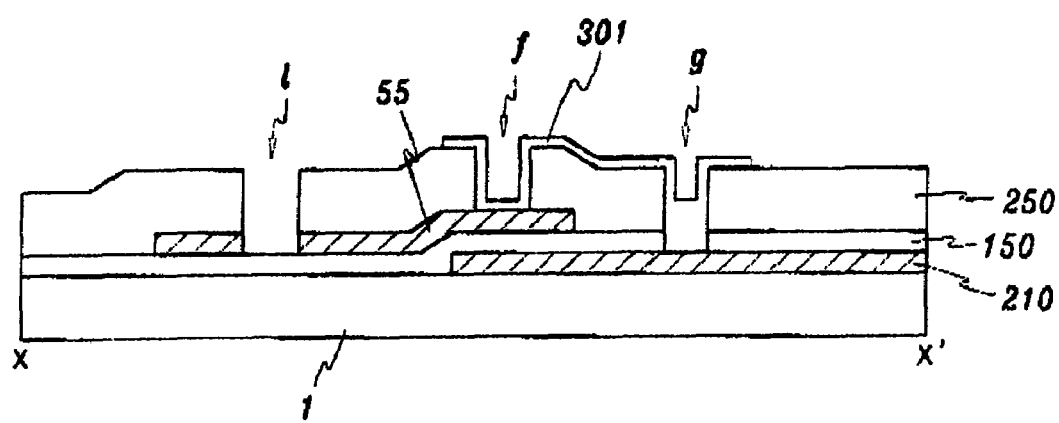

As shown in FIGS. 11F and 12F, the gate shorting bar 200 is disconnected from the gate extensions 101, 102 and 103 between the first secondary line 410 and the gate shorting bar 200, and the data shorting bar 400 is disconnected from the data extensions 501, 502 and 503 between the third secondary line 210 and the data shorting bar 400.

More in detail, the gate extensions 101 and 102 between the first secondary line 410 and the gate shorting bar 200, and the data extensions 501, 502 and 503 between the third secondary line 210 and the data shorting bar 400 are exposed in the step of etching the passivation film 250. After connecting members 301, 302, 303, 310 and 320 are formed, the exposed portions of the extended lines 101, 102, 501, 502 and 503 are etched and removed. The gate shorting bar 200 and the data shorting bar 400 may be removed by cutting along the cutting line L1 before the array tests.

As previously described, since two adjacent gate lines are connected to two different secondary lines and three adjacent data lines are connected to three different secondary lines, it is easy to test visual quality of the LCD.

Now, the connecting structure between the secondary lines and the gate lines is described again.

Figure 13:
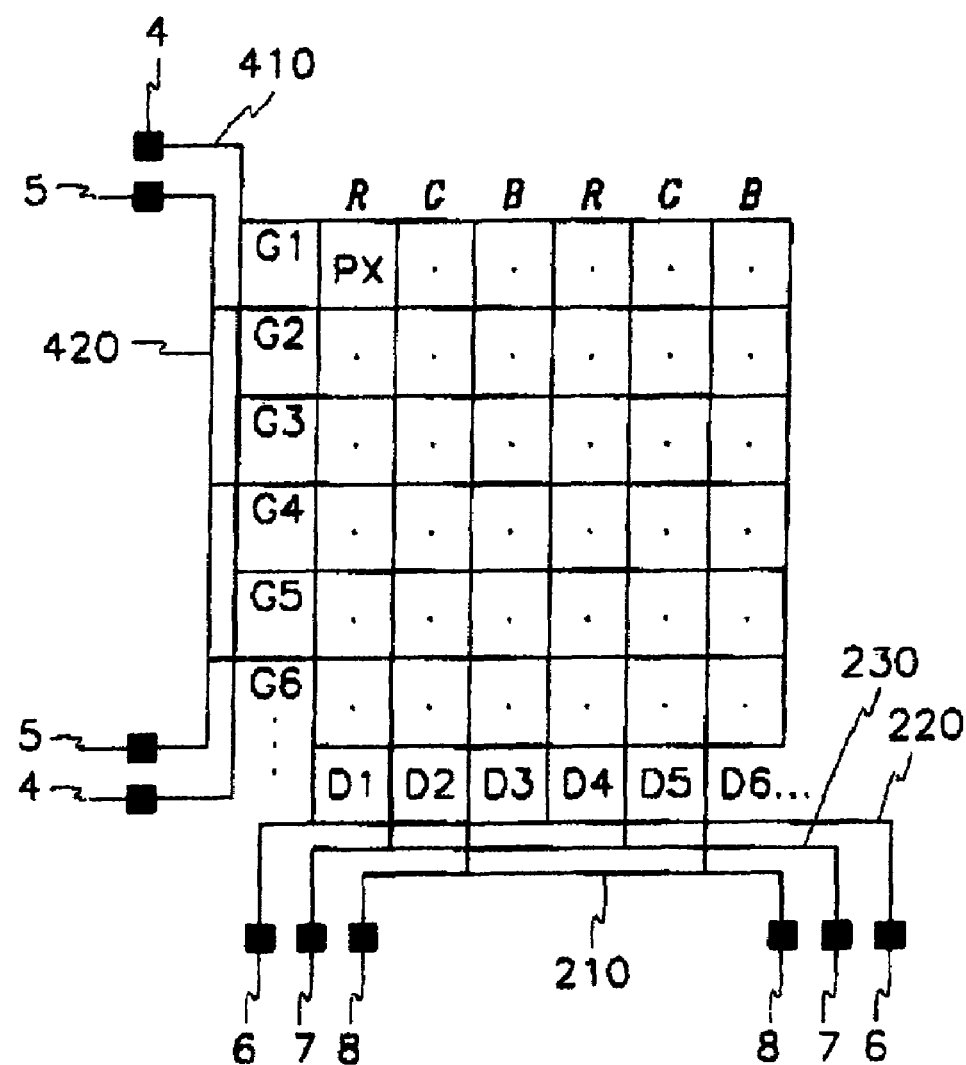
FIG. 13 is a schematic diagram which illustrates the manner of connections between a wire and shorting bars according to the present invention.

As shown in FIG. 13, a plurality of gate lines G1, G2, G3, G4, G5 and G6 and a plurality of data lines D1, D2, D3, D4, D5 and D6 intersect to define a plurality of pixels arranged in a matrix.

Since odd gate lines G1, G3 and G5 and even gate lines G2, G4 and G6 are separately connected to the first and to the second secondary lines 410 and 420, it is possible to apply different signals to the odd pixel row and to the even pixel row.

Three adjacent data line, that is, (3n−2)th, (3n−1)th and (3n)th data lines are connected to the pixels in different rows and arranged in three shifts, for example, R, G, B pixel columns. Since the third, the fourth and the fifth secondary lines are separately connected, three other signals can be applied to the three adjacent pixel columns through the secondary lines 210, 220 and 230. Testing pads 4, 5, 6, 7 and 8 are respectively formed at the ends of the secondary lines 410, 420, 210, 220 and 230.

Figure 14:
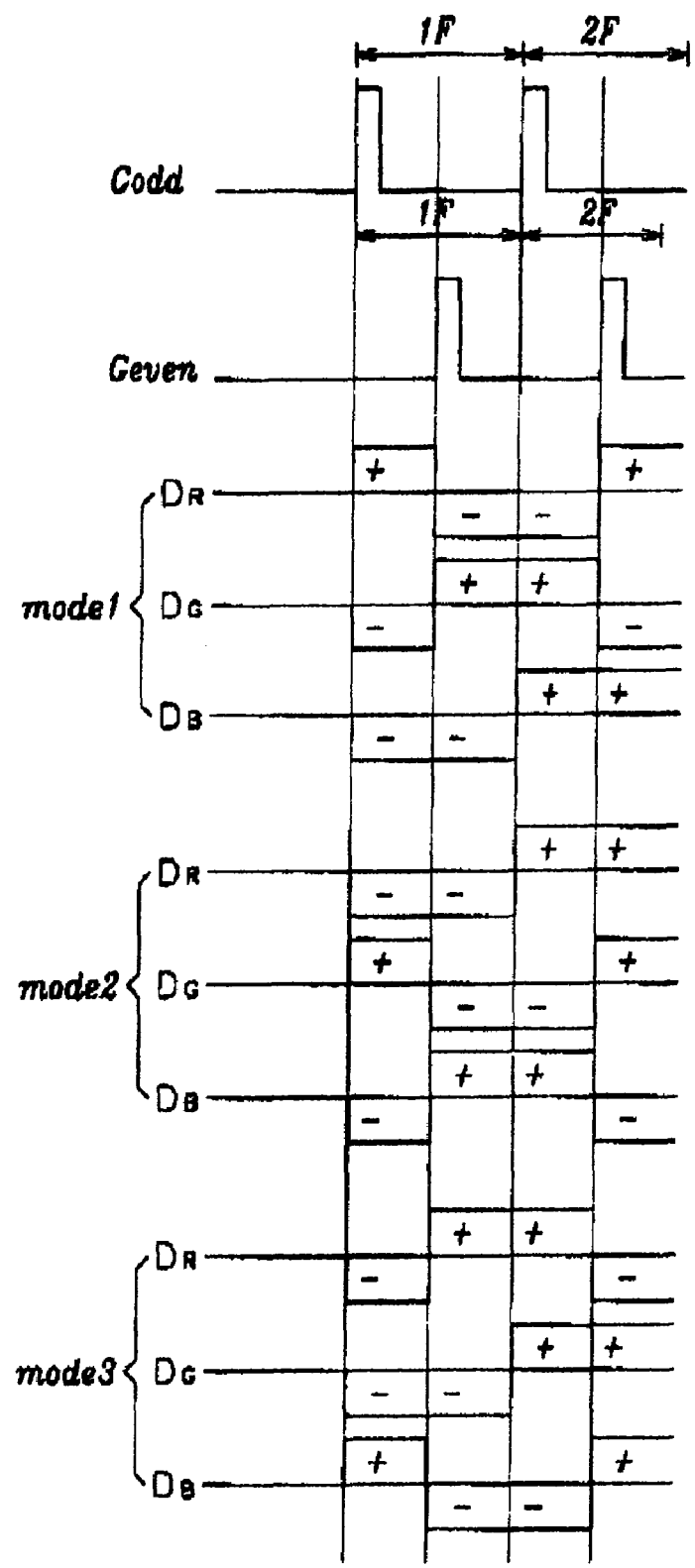
FIG. 14 illustrates wave forms of array test signals applied to gate lines and data lines according to the first embodiment.
Figures 15A, 15B:
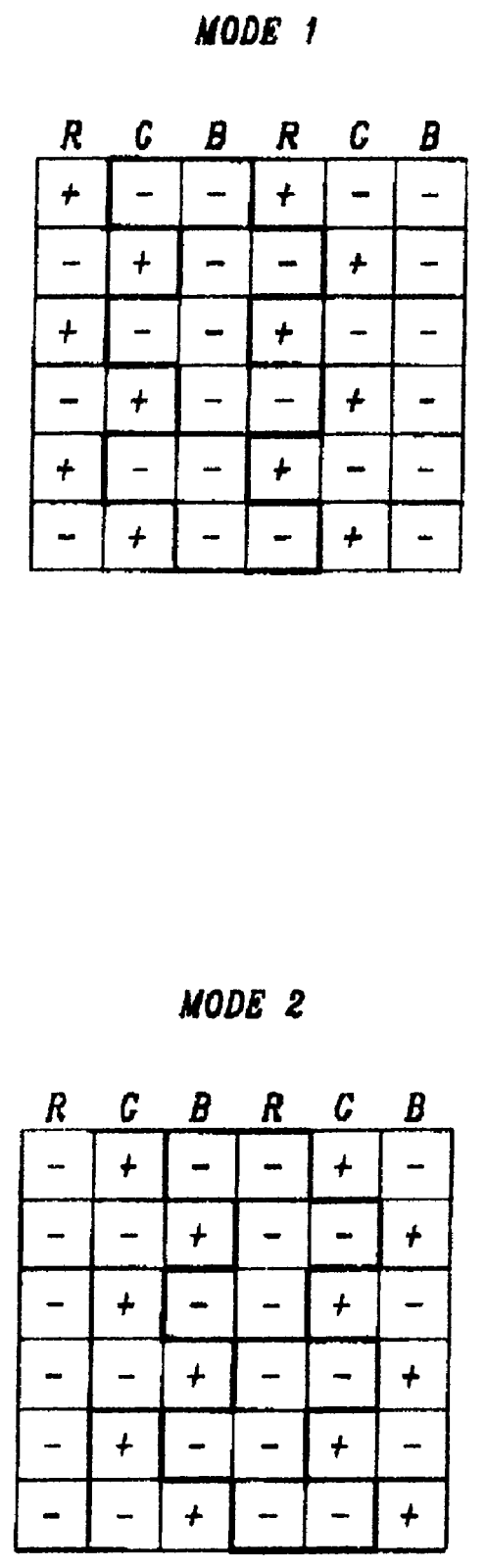
Figure 15C:
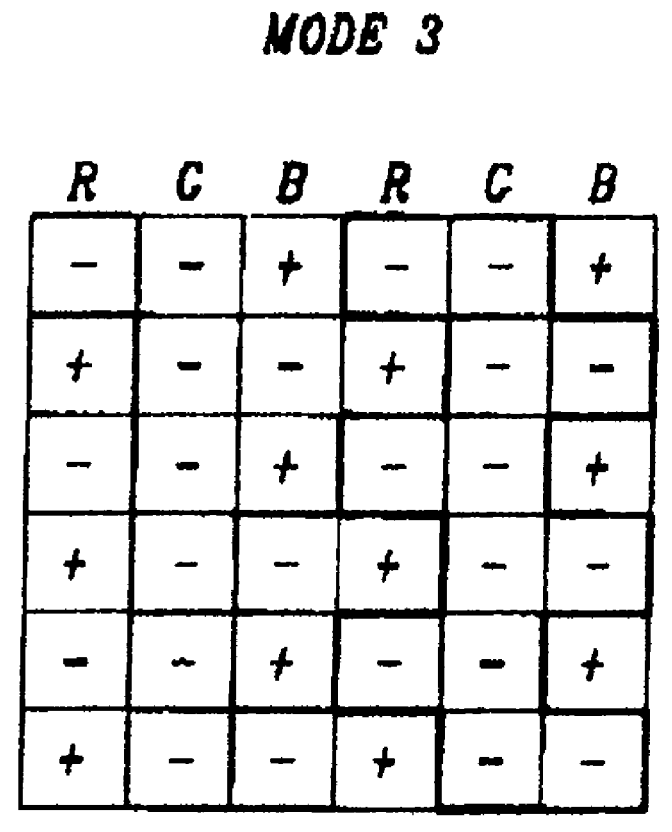

Then, a visual test method according to the first embodiment is described with references to FIGS. 13, 14 and 15A to 15C. FIG. 14 illustrates wave forms of array test signals applied to gate and data lines through the respective secondary lines and FIGS. 15A to 15C illustrate polarities of signals applied to R, G, B pixels in modes 1 to 3. As shown in FIGS. 13 and 14, signal voltages $G_{odd}$ and $G_{even}$ are applied to a plurality of gate lines in odd rows and a plurality of gate lines in even rows. Signal voltages $D_R$, $D_G$ and $D_B$ are respectively applied to a plurality of (3n−2)th, (3n−1)th and (3n)th data lines through the first to the fifth secondary lines 410, 420, 210, 220 and 230.

Then, the signal voltages are described more in detail hereinafter. Signal voltages $G_{odd}$ and $G_{even}$, which respectively include pulses turning on thin film transistors, are applied to odd gate lines and to even gate lines through the first and the second secondary lines 410 and 420. If the period from the moment one pulse is applied to the moment next pulse is applied is defined as one frame, the signal voltage $G_{even}$ for the even gate lines follows the signal voltage $G_{odd}$ for the odd gate lines by a half frame. As a result, the TFTs in even row pixels are turned on with a half frame difference against the TFTs in odd row pixels.

Meanwhile, polarities of the data signal voltages $D_R$, $D_G$ and $D_B$ which are respectively applied to R, G, B pixel columns invert once a frame and at the moment that the pulses are applied to the odd or the even gate lines. As described more in detail, the signal voltages applied to the selected two of R, G, B pixel columns invert at the same time and the polarities of the signals are opposite. For example, as shown in FIG. 14, signals having the same polarity are applied to the two of the three pixel columns and invert at the moment that the even gate pulses are applied. A signal having an opposite polarity is applied to the rest of the three pixel columns and inverts at the moment that the odd gate pulse is applied.

FIG. 14 shows signals in the three modes. First, in the first mode (mode 1), the test signal $D_R$ applied to R pixel column and the test signal $D_G$ applied to G pixel column have opposite polarities and invert when the pulse is applied to the even gate line, and the test signal $D_B$ applied to B pixel column invert when the pulse is applied to the odd gate line. The polarities of the test signals DR, DG and DB are respectively (+), (−) and (−) when the first frame (1F) starts.

Then, in the second mode (mode 2), the test signals $D_R$, $D_G$ and $D_B$ applied to the R, G and B pixel columns are the same as the test signals $D_B$, $D_R$ and $D_G$ applied to the B, R and G pixel columns in the first mode (mode 1). Moreover, in the third mode (mode 3), the test signals $D_R$, $D_G$ and $D_B$ applied to the R, G and B pixel columns are the same as the test signals $D_G$, $D_B$ and $D_R$ applied to the G, B and R pixel columns in the first mode (mode 1) and the test signals $D_B$, $D_R$ and $D_G$ applied to the B, R and G pixel columns in the second mode (mode 2).

Then, polarities of the pixels when the above signals are applied to each of the pixels will be described. First, if the pulse is applied to odd gate lines, TFTs of the pixels in odd rows are turned on and the test signals are applied to pixels in odd rows. When the TFTs of the pixels in odd rows are turned off and the pulse is applied to even gate lines, the test signals are applied to pixels in even rows through the turned-on TFTs of the pixels in even rows. Therefore, the polarities of the pixels in the first frame (1F) of the first to the third modes are illustrated as in the FIGS. 15A to 15C. The polarities in the second frame (2F) are the opposite.

As shown in FIG. 15A, in the first mode (mode 1), one of the pixels in R pixel column and one of the pixels in G pixel column respectively have (+) and (−), or (−) and (+) polarities, and the polarities invert according to the columns. However, all the pixels in B pixel column have the same polarity (−). In case of the row direction, the G and B pixels in odd rows have the same polarity and the R pixels in odd rows have the polarity opposite to the R and G pixels. Though, the B and R pixels in even rows have the same polarity and the G pixels in odd rows have the polarity opposite to the B and R pixels.

Then, as shown in FIG. 15B, in the second mode (mode 2), one of the pixels in G pixel column and one of the pixels in B pixel column respectively have (+) and (−), or (−) and (+) polarities, and the polarities invert according to the columns. All the pixels in the R pixel column have the same polarity (−). In case of the row direction, the B and R pixels in odd rows have the same polarity and the G pixels in odd rows have the polarity opposite to the B and R pixels. The R and G pixels in even rows have the same polarity and the B pixels in odd rows have the polarity opposite to the R and G pixels.

Furthermore, as shown in FIG. 15C, in the third mode (mode 3), one of the pixels in R column and one of the pixels in B column respectively have (+) and (−), or (−) and (+) polarities, and the polarities invert according to the columns. All the pixels in G column have the same polarity (−). In case of the row direction, the R and G pixels in odd rows have the same polarity and the B pixels in odd rows have the polarity opposite to the R and G pixels. The G and B pixels in even rows have the same polarity and the R pixels in odd rows have the polarity opposite to the G and B pixels.

It is possible to detect the short-circuited defects between two adjacent gate lines or two adjacent data lines by adopting one of the three modes. In case that the short-circuited defects occur between two adjacent pixels to which the different signals having the opposite polarities are applied, the signal voltages applied to the pixels are shifted to one value, the mean of the two voltages. As a result, the same voltage is applied to the pixels. Therefore, it is possible to determine the short-circuited defects since the same gray image is displayed in the adjacent short-circuited pixels. Moreover, in case in which the short-circuited defects occur between the adjacent wires, it is easy to detect the short-circuited defects between the wires since the same signal is applied to the pixels of the rows or the columns which are connected to the short-circuited wires.

However, it is difficult to detect the short-circuited defects between the adjacent pixels to which the same testing signal is applied and to determine the exact location of the same. To solve this problem, if any two of the three modes are adopted for the test, it is possible to easily detect the pixel defects such as short-circuited defects between the adjacent pixels and to determine the location of the defects, since different kinds of polarities are applied to the adjacent pixels in a row direction and in a column direction at least one time.

Furthermore, in the testing method according to the first embodiment, it is effective to test a visual uniformity since the polarities of the signals $D_R$, $D_G$ and $D_B$ applied to the respective secondary lines 210, 220 and 230 last for one frame and the signal fluctuation is ignorable.

Figure 16:
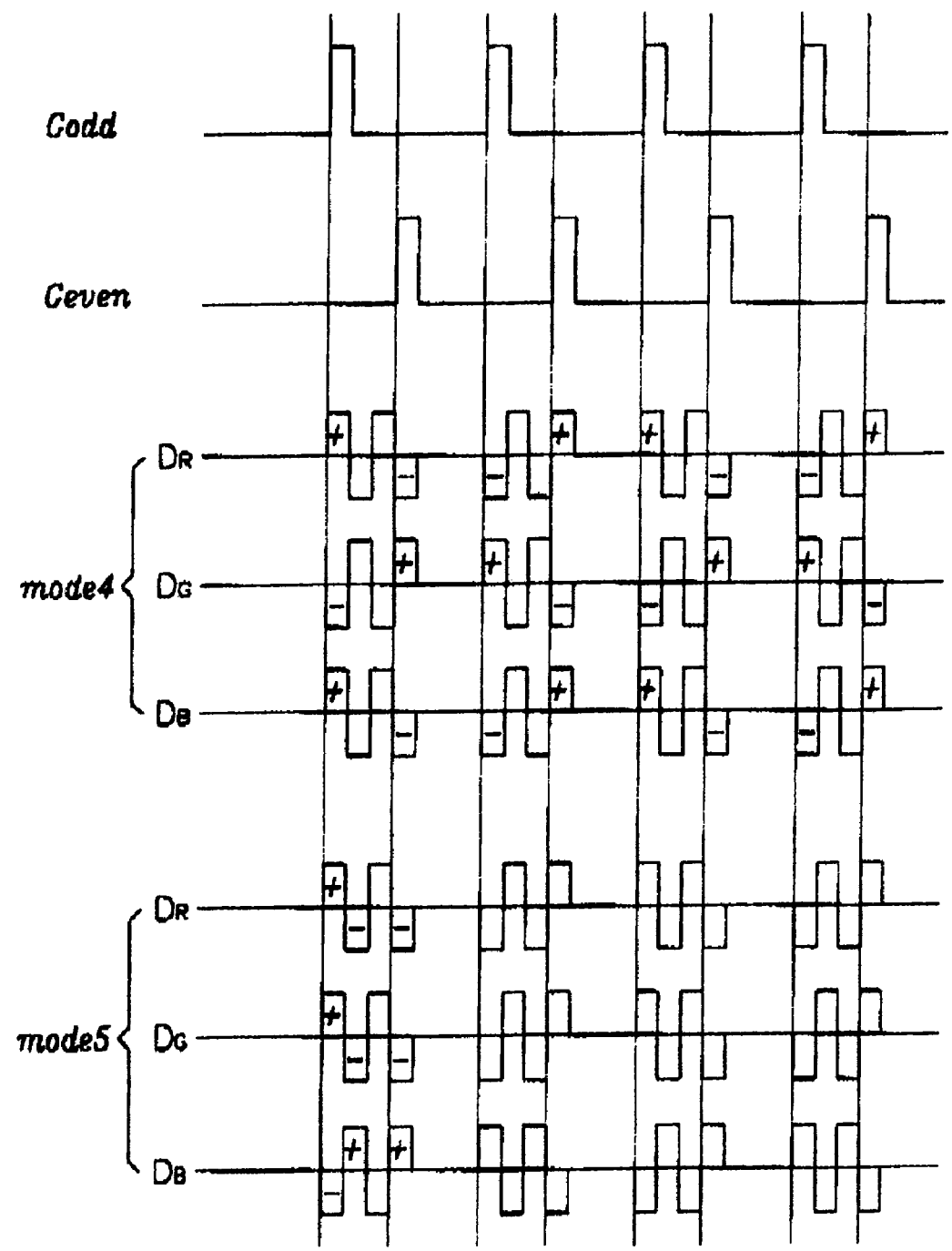
FIG. 16 illustrates wave forms of array test signals applied to gate lines and data lines according to the second embodiment.
Figures 17A, 17B:
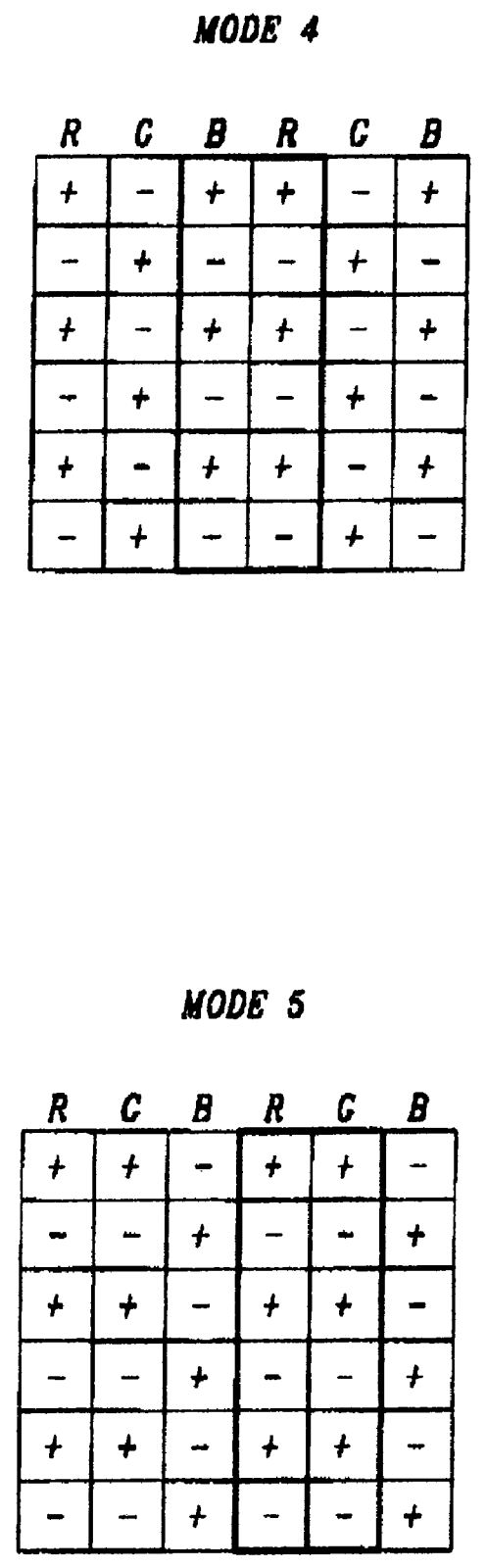

Now, a visual test method according to the second embodiment is described with reference to FIGS. 16, 17A and 17B. FIG. 16 illustrates wave forms of array test signals applied to gate and data lines according to the second embodiment, and FIGS. 17A to 17B illustrate polarities of signals applied to R, G, B pixels according to the second embodiment.

Signal voltages $G_{odd}$ and $G_{even}$, and $D_R$, $D_G$ and $D_B$ as shown in FIG. 16 are respectively applied to gate lines in odd and in even pixel rows and (3n−2)th, (3n−1)th and (3n)th data lines through the first to the fifth secondary lines 410, 420, 210, 220 and 230. Like the first embodiment, if the period from the moment one pulse is applied to the moment next pulse is applied is defined as one frame, the signal voltage $G_{even}$ for the even gate lines follows the signal voltage $G_{odd}$ for the odd gate lines by a half frame.

Meanwhile, data signal voltages $D_R$, $D_G$ and $D_B$ applied to R, G and B pixel columns invert several times in a frame with the same period as the width of the pulse. The polarities of the signal voltages $D_R$, $D_G$ and $D_B$ invert at the moments that the gate pulses are respectively applied to the odd gate lines and to the even gate lines, and the polarity at the moment that the pulse is applied to the odd gate lines is opposite to the polarity at the moment that the pulse is applied to the even gate lines. The signals having the same polarity are applied to any two of the R, G and B pixel columns, and the signal having the polarity opposite to the two pixel columns is applied to the rest of the R, G and B pixel columns.

FIG. 16 shows the signals of two modes. In the fourth mode (mode 4), the same test signals $D_R$ and $D_B$ having the same polarity and the same inversion period are applied to the pixels in R pixel column and the pixels in B pixel column, and a test signal $D_G$ having the same inversion period as the test signals $D_R$ and $D_B$ and the opposite polarity is applied to the pixels in G pixel column. Then, in the fifth mode (mode 5), the same test signals are applied to the pixels in R pixel column and in G pixel column and the test signal having the opposite polarity is applied to the pixels in B pixel column.

FIGS. 17A and 17B show the polarities in the pixels when the signals are applied according to the fourth and the fifth modes. In the fourth mode shown in FIG. 17A, all adjacent pixels in a column direction have the polarities opposite to each other and all adjacent pixels except the adjacent B and R pixels in a row direction have the opposite polarities. In the fifth mode shown in FIG. 17B, all adjacent pixels in the column direction have the polarities opposite to each other and all the adjacent pixels except the adjacent R and G in the row direction have the opposite polarities.

As described in the first embodiment, it is possible to detect the short-circuited defects by using one of the two modes in the second embodiment. When both of the two modes are adopted, the detecting ability is increased so that pixel defects such as the short-circuited defects between the adjacent pixels to which the test signal having the same polarity is applied are easily detected.

In the defect detecting method according to the second embodiment, since polarities of the test signals applied to R, G and B pixel columns invert with the same period as the width of the gate pulse, the signals is not charged into the pixels sufficiently. As a result, flicker effects may occur. In addition, it is not suitable to test for visual uniformity that is usually confirmed by naked eyes, and it is difficult to detect the pixel defects under the high state or off state.

Figure 18:
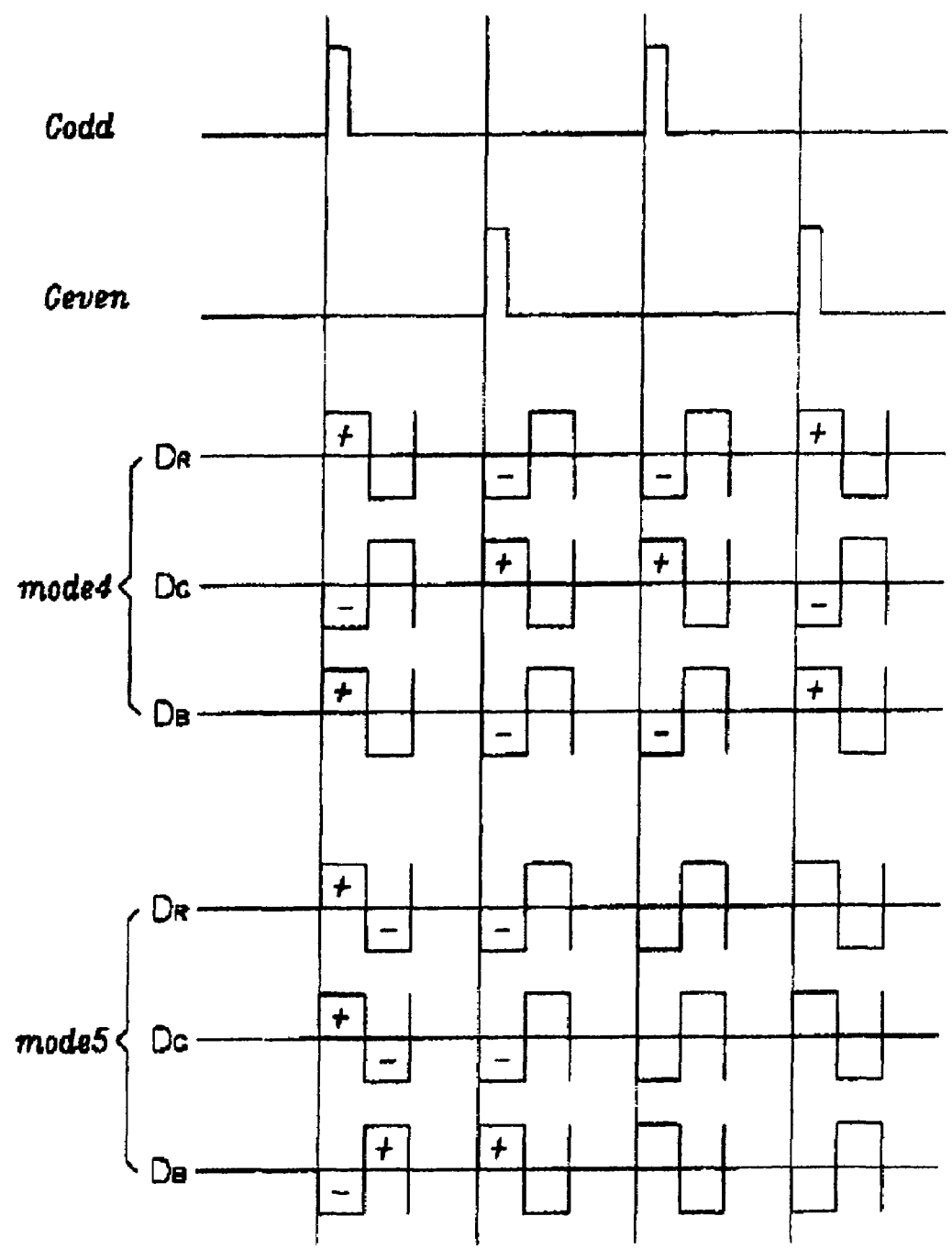
FIG. 18 illustrates wave forms of array test signals applied to gate lines and data lines according to the third embodiment.

FIG. 18 shows testing wave forms according to the third embodiment to improve this problem. In FIG. 18, signals $D_R$, $D_G$ and $D_B$ applied to R, G and B pixel columns and signals $G_{odd}$ and $G_{even}$ applied to odd and even gate lines are mostly similar to the signals in the second embodiment. Instead, the signals applied to the R, G and B pixel columns invert with a period of two times the width of the gate pulse. Therefore, there is no difficulty in charging the R, G and B signals into the pixels, it is easy to synchronize the gate pulse and the data signals, and the flicker effect is reduced. As a result, the test method according to the third embodiment is superior in testing uniformity and defects under high and off states.

Figure 19:
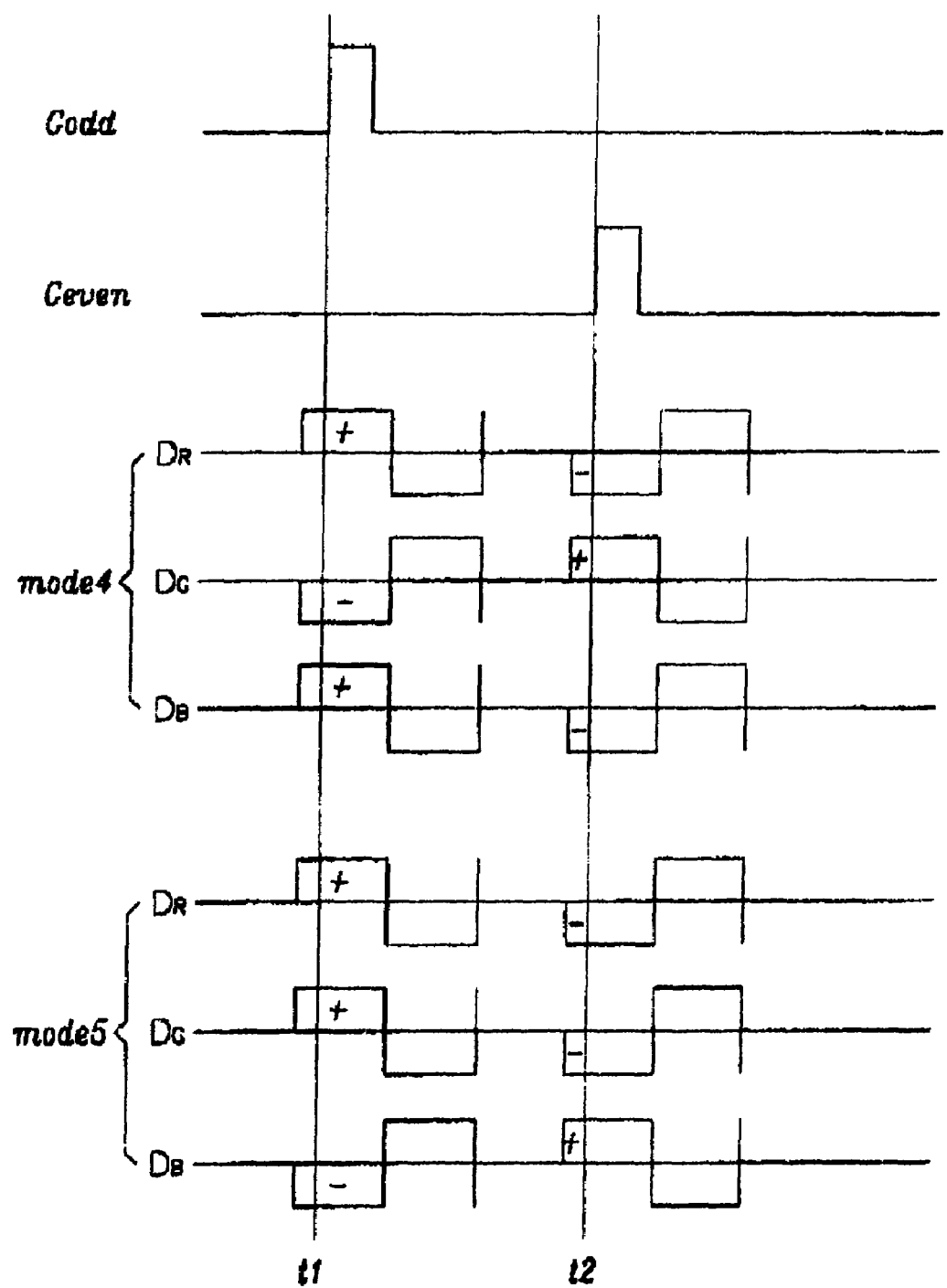
FIG. 19 illustrates wave forms of array test signals applied to gate lines and data lines according to the fourth embodiment.

FIG. 19 illustrates wave forms of array test signals according to the fourth embodiment, in which pulses are applied to the odd gate lines and to the even gate lines and the two pulses are synchronized with a half frame difference. Test signals invert with a period of twice the width of the gate pulse.

In the fourth embodiment, the gate pulse is applied later than the moment (t1, t2) when the signals $D_R$, $D_G$ and $D_B$ applied to the R, G and B pixel columns invert. Therefore, the signals can be charged with a large initial charging value when TFTs are turned on. As a result, the charging time decreases and the signals can be charged sufficiently while the gate pulse is applied. Therefore, it is easy to test even a high resolution substrate.

As described above, in the LCD according to the present invention, since gate secondary shorting bars or data secondary shorting bars are respectively formed with more than two divided lines and separated from a gate shorting bar and a data shorting bar, the substrate is superior against electrostatic charges. In addition, since different test signals can be applied to the gate and the data secondary shorting bars, the detecting ability for the substrate is increased. As a result, it is possible to reduce a manufacturing cost because the substrate in which the defects occurred is not continued to the next step, but discarded in the testing step. In addition, it is possible to easily test a high resolution substrate by starting charging data signals before the moment the gate pulse is applied in order to sufficiently charge the data signals to pixels.

In the drawings and specification, there have been disclosed typical preferred embodiments of the invention and, although specific terms are employed, they are used in a generic and descriptive sense only and not for purpose of limitation, the scope of the invention being set forth in the following claims.

What is claimed is:

1. A thin film panel comprising:
   a first testing line extending in a first direction;
   a second testing line substantially parallel to the first testing line;
   a first conductive extension extending in a second direction;
   a second conductive extension substantially parallel to the first conductive extension;
   an insulating film intervened between the first and second testing lines and the first and second conductive extensions;
   a first connecting member electrically connected to the first conductive extension and to the first testing line; and
   a second connecting member electrically connected to the second conductive extension and to the second testing line,
   wherein the first and second connecting members are located at a first layer, the first and second conductive extensions are located at a second layer different from the first layer, and the first and second testing lines are located at a third layer different from the first and second layers.

2. The thin film panel of claim 1, further comprising signal lines extending in the second direction and electrically connected to the first and second conductive extensions for inspection and electrically disconnected from the first and second conductive extensions after the inspection.

3. The thin film panel of claim 2, wherein the signal lines are data lines.

4. The thin film panel of claim 2, wherein the signal lines are gate lines.

5. A thin film panel comprising:
   a first testing line extending in a first direction;
   a second testing line substantially parallel to the first testing line;
   a third testing line substantially parallel to the first testing line;
   an insulation film formed on the first, second and third testing lines;
   a first conductive extension extending in a second direction and formed on the insulation film;
   a second conductive extension substantially parallel to the first conductive extension and formed on the insulation film;
   a third conductive extension substantially parallel to the first conductive extension and formed on the insulation film;
   a passivation film formed on the first, second and third conductive extensions;
   a first connecting member electrically connected to the first conductive extension through a first contact hole penetrating the passivation film and to the first testing line by penetrating the insulating film and the passivation film;
   a second connecting member electrically connected to the second conductive extension through a second contact hole penetrating the passivation film and to the second testing line by penetrating the insulating film and the passivation film; and
   a third connecting member electrically connected to the third conductive extension through a third contact hole penetrating the passivation film and to the third testing line by penetrating the insulating film and the passivation film.

6. The thin film panel of claim 5, further comprising a first, second and third data lines extending in the second direction and electrically connected to the first, second and third conductive extensions for inspection and electrically disconnected from the first and second conductive extensions after the inspection.

7. The thin film panel of claim 6, wherein the first, second and third data lines receive red, green and blue signals.

8. A thin film panel comprising:
   a first testing line extending in a first direction;
   a second testing line substantially parallel to the first testing line;
   a third testing line substantially parallel to the first testing line;
   a fourth testing line extending in a second direction;
   a fifth testing line substantially parallel to the fourth testing line;
   a plurality of first conductive extensions extending in the second direction, comprising a first, second and third groups;
   a plurality of second conductive extensions extending in the first direction, comprising a fourth and fifth groups;
   a plurality of first connecting members electrically connected to the first group of the plurality of first conductive extensions through first contact holes and to the first testing line through second contact holes;
   a plurality of second connecting members electrically connected to the second group of the plurality of first conductive extensions through third contact holes and to the second testing line through fourth contact holes;
   a plurality of third connecting members electrically connected to the third group of the plurality of first conductive extensions through fifth contact holes and to the third testing line through sixth contact holes;

a plurality of fourth connecting members electrically connected to the fourth group of the plurality of second conductive extensions through seventh contact holes and to the fourth testing line through eighth contact holes, and a plurality of fifth connecting members electrically connected to the fifth group of the plurality of second conductive extensions through ninth contact holes and to the fifth testing line through tenth contact holes.

9. The thin film panel of claim 8, further comprising:

an insulating film formed on the first, second and third testing lines; and a passivation film formed on the plurality of first and second conductive extensions and the insulating film, wherein the first, third, and fifth contact holes expose the plurality of first conductive extensions, penetrating the passivation film and the second, fourth and sixth contact holes expose the first, second, and third testing lines, penetrating the insulating film and the passivation film.

10. The thin film panel of claim 8, further comprising a first, second and third data lines extending in the second direction and electrically connected to the first, second and third groups of the plurality of first conductive extensions for inspection and electrically disconnected from the plurality of first conductive extensions after the inspection.

11. The thin film panel of claim 10, wherein the first, second and third data lines receive red, green and blue signals, respectively.

12. The thin film panel of claim 11, further comprising a plurality of gate lines extending in the first direction, wherein odd and even lines of the plurality of gate lines are electrically connected to the fourth and fifth groups of the plurality of second conductive extensions for the inspection and electrically disconnected from the plurality of second conductive extensions after the inspection.

13. A thin film panel comprising:

a first conductive extension extending in a first direction;

a second conductive extension substantially parallel to the first conductive extension;

an insulation film formed on the first and second conductive extensions;

a first testing line extending in a second direction and formed on the insulation film;

a second testing line substantially parallel to the first testing line and formed on the insulation film;

a passivation film formed on the first and second testing lines;

a first connecting member electrically connected to the first conductive extension through a first contact hole penetrating the passivation film and the insulation film and to the first test line by penetrating the passivation film; and a second connecting member electrically connected to the second conductive extension through a second contact hole penetrating the passivation film and the insulating film and to the second testing line by penetrating the passivation film.

* * * * *